May 15, 1934.  H. U. BASSO  1,958,655
CLOTH WORKING MACHINE
Filed July 5, 1933    3 Sheets-Sheet 1
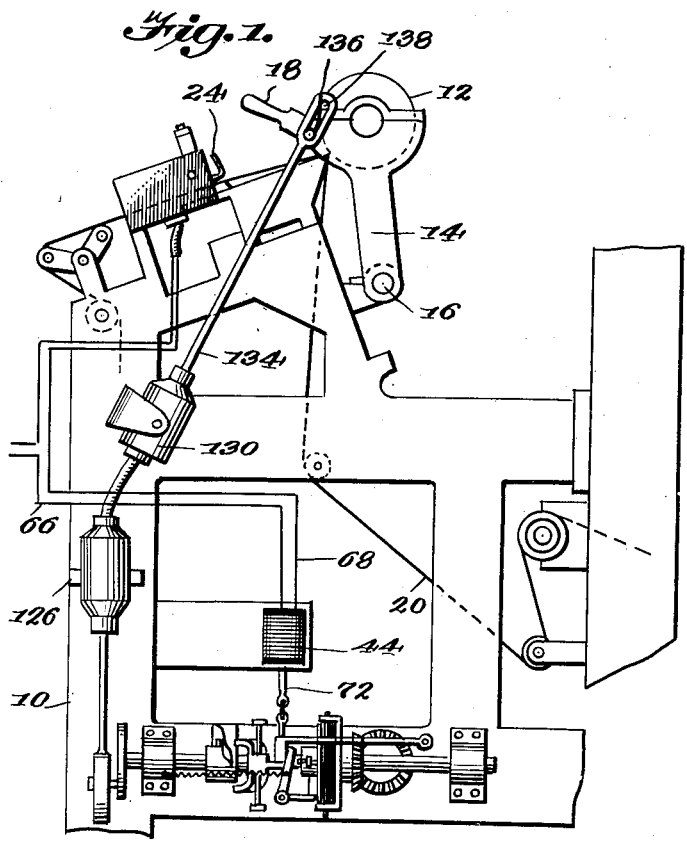
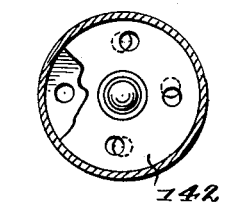
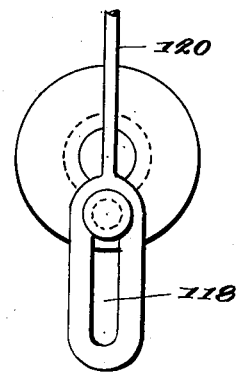
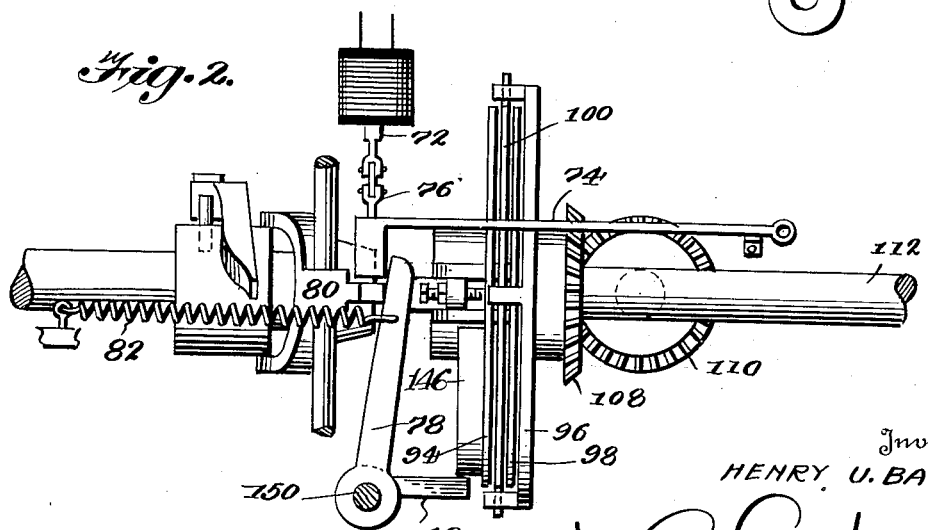
Inventor
HENRY U. BASSO
By L. Edw Flaherty
Attorney

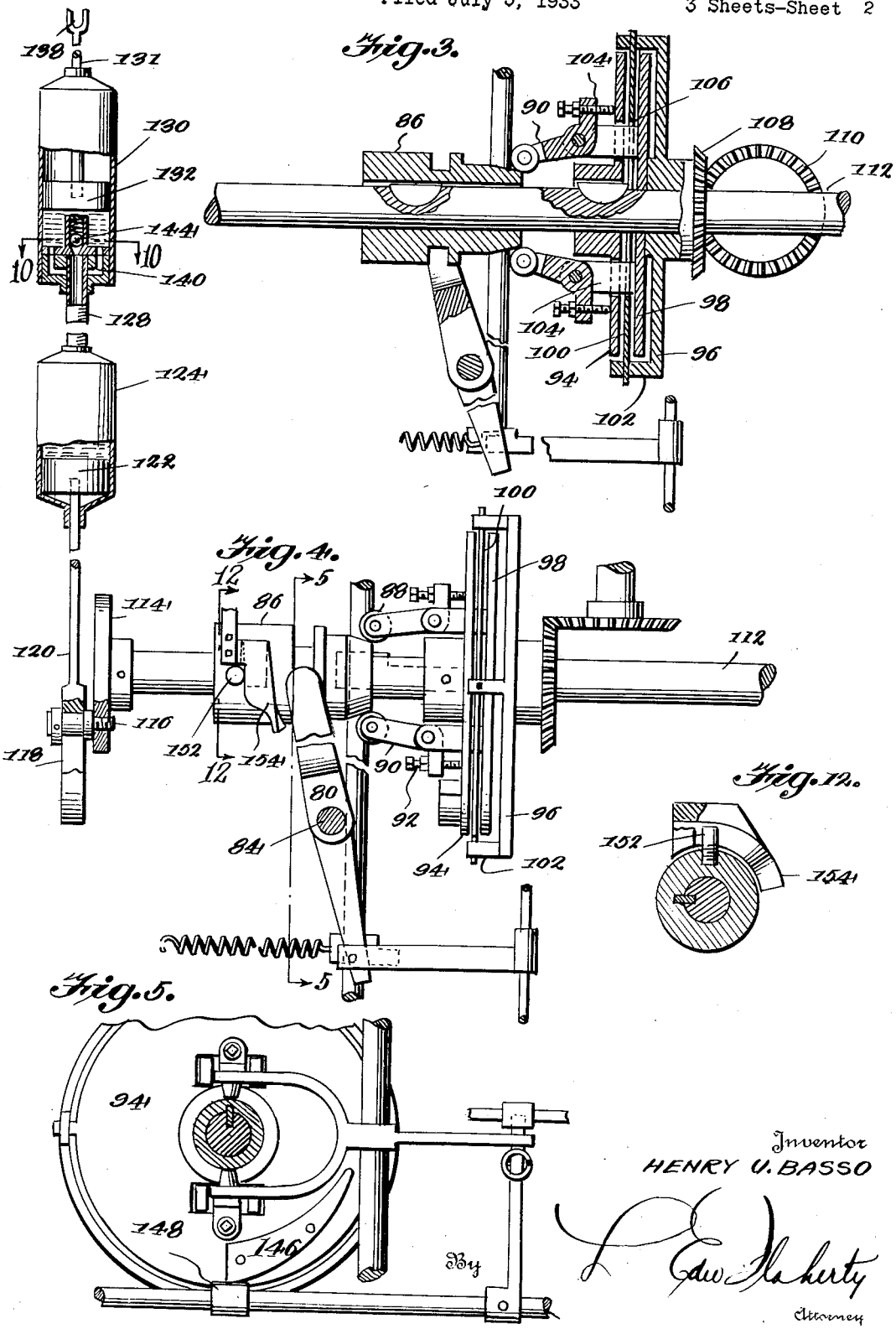

May 15, 1934.                H. U. BASSO                1,958,655
CLOTH WORKING MACHINE
Filed July 5, 1933            3 Sheets-Sheet 3
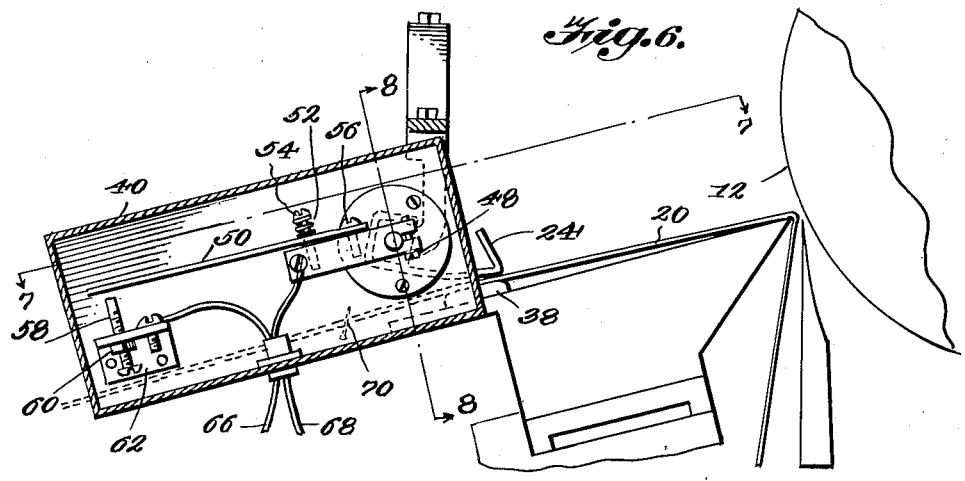
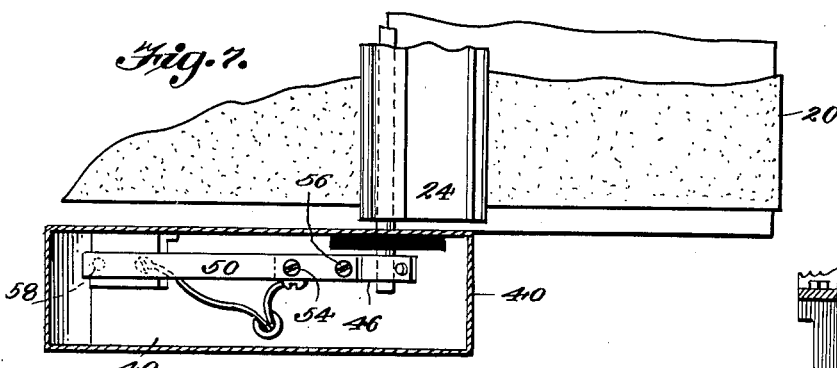
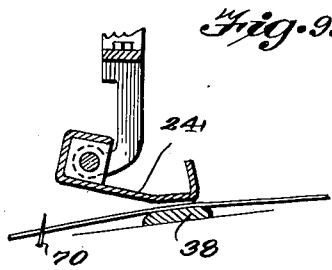
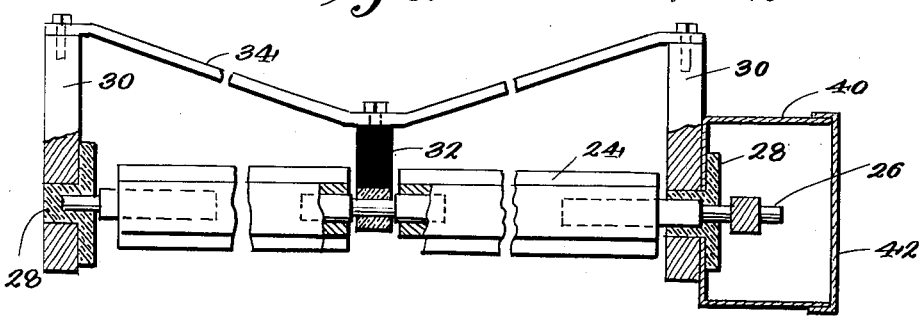
Inventor
HENRY U. BASSO
By L. Edw Mahuty
Attorney Patented May 15, 1934

1,958,655

UNITED STATES PATENT OFFICE 1,958,655

CLOTH WORKING MACHINE

Henry U. Basso, Springfield, Vt.

Application July 5, 1933, Serial No. 679,129

18 Claims. (Cl. 164—60)

The present invention relates to a cloth shearing machine and has special reference to a means for retracting the shearing mechanism of the cloth upon the encountering of a transverse seam metal or other surface inequalities therein and is an improvement over my copending application Serial No. 622,351 filed July 13, 1932.

More specifically the present invention contemplates the provision of a simple and automatic means by which the shearing mechanism is moved to a retracted position with respect to the cloth, when a seam is encountered, or metal or the like in the cloth which would damage the shearing element. It is to be noted in this connection that if the shearing mechanism were not retracted the seam would be cut off and it would be necessary for the operator to stop the machine and sew the same together again.

Heretofore it has been necessary for an attendant to carefully keep on the lookout for the presence of any metal or the like in the cloth which might injure the sharp shearing edge of the shearing element and also, to be in constant attendance to retract the shearing mechanism when a seam is encountered.

It is therefore an important object of the present invention to provide a blade raising attachment of the aforementioned type, which may be applied to different types of shearing machines either during the manufacture thereof or at any time thereafter and which when applied will not in any manner interfere with the normal functioning of the machine. It is to be noted that a single attendant is enabled to supervise the operation of a number of different machines and is consequently relieved for other duties.

A further important object of the present invention and an improvement over the invention disclosed in the copending application is to provide a shearing element retracting attachment which will not only retract the shearing element upon the encountering of a seam in the cloth but which will also upon the presence of any metal or the like which might be injurious to the shearing knives automatically retract the shearing element upon the presence of the same.

Other objects and advantages will become apparent during the course of the following description.

In the accompanying drawings, forming a part of this application and in which like numerals are employed to designate like parts throughout the same, Figure 1 is a fragmentary side elevation of a cloth shearing machine with the retracting or releasing mechanism in place, Figure 2 is a fragmentary side elevation of a clutch mechanism embodied in the invention, Figure 3 is a fragmentary plan view of the clutch mechanism partly in section, Figure 4 is a fragmentary plan view illustrating the mechanism shown in Fig. 2, Figure 5 is a detail transverse sectional view taken on line 5—5 of Figure 4, Figure 6 is a side elevational view partly in section of the feeler mechanism, Figure 7 is a fragmentary horizontal sectional view of Fig. 6 taken on line 7—7 thereof.

Figure 8 is a sectional view of Fig. 6 taken on line 8—8 looking in the direction of the arrows, Figure 9 is a detail vertical sectional view illustrating the manner in which the feeler mechanism is secured to the machine, Figure 10 is a detail horizontal sectional view taken on line 10—10 of Figure 4, Figure 11 is a detail elevation illustrating the motion transmitting mechanism between the clutch organization and the shearing actuating mechanism, and Fig. 12 is a detail transverse sectional view of Fig. 4 taken on line 12—12 thereof.

In the drawings, wherein for the purpose of illustration is shown a preferred embodiment of the invention, the numeral 10 designates a cloth shearing machine embodying a rotatable shearing element 12 mounted upon a U-shaped blade frame 14. The blade frame is horizontally pivoted and is mounted to be rocked about the horizontally mounted pin 16 so that when a seam is encountered in the adjacent cloth 20 the shearing element 12 may be retracted or moved to an inoperative position.

As illustrated in Figure 1, the blade frame 14 is provided with a handle 18 adapted for manual engagement to permit an attendant to retract the shearing element 12 by hand when a seam in the cloth is encountered.

The cloth is generally designated by the reference numeral 20 and as illustrated is shown to be travelling through the machine beneath the shearing element 12 for engagement by the spiral or other cutting means thereof.

As clearly pointed out in the opening paragraphs of the specification, the purpose of this invention is to provide for the automatic retraction of the shearing element 12 when a seam or metal which might injure the cutting element is encountered and to that end there will be found a feeler 24 located in operative relation to the cloth and at the approach or feeding side of the shear 12.

Referring more particularly to Figure 8, it will be seen that the feeler 24 is mounted on a shaft 26 which is pivotally mounted in the insulating bearing 28 constructed of fiber or the like mounted in the brackets 30 which are secured to the machine. The shaft 26 is supported at its center by means of the insulating bracket 32 mounted on the cross arm 34 secured to the bracket 30.

As clearly illustrated in Figure 9, the feeler 24 is bent around the shaft 26 and secured thereto and depends downwardly having an upturned portion. In its normal position the feeler is spaced from the cloth and directly therebeneath is a transversely extending metallic bar 38.

On one side of the machine there is securely fastened a metallic box 40 having a cover 42 which encloses the circuit-making-and-breaking device controlling the energization of the magnet 44. The circuit making and breaking device consists of an arm 46 having a bifurcated end which is secured to the end of the shaft 26 by means of a screw threaded bolt 48. On the upper side of the arm 46 there is resiliently mounted a contacting arm 50 which is adjustable by means of a resilient spring 52 encircling the screw-threaded bolt 54 in the arm 46. The arm is secured to the contacting member 50 by means of the screw bolt 56. The electrical contacting member 50 has associated therewith a stationary electrical contact 58 which is adjustable by means of the nuts 60 in the L-shaped bracket 62 secured to the inner side of the box 40. Conductors 66 and 68 are respectively electrically connected to the bracket 62 and the arm 46 and to the coil 44. It will thus be seen that the feeler has a two-fold purpose to the end that if any metallic element such as a pin 70 or the like is embedded in the cloth upon the passing of the same between the feeler 24 and the transversely extending metallic bar 38, an electric flow of current will pass from ground to a source of electrical supply, the winding of the magnet 44, the conductor 68, the arm 46, shaft 26, feeler 24, through the metallic element, and back to the ground through the medium of the metallic bar 38 thereby energizing the winding of the magnet 44 and thereby bring about the operation of the longitudinal movement of the core 72 of the solenoid 44.

On the other hand, upon the passing of a seam of the cloth between the bar 38 and the feeler 24 the shaft 26 will be rotated in an anti-clockwise direction causing the electrical contact arm 50 and its associated stationary electrical contacts 58 to thereby close the electrical circuit through the source of the supply and the winding of solenoid 44 to bring about longitudinal movement of the core of the solenoid 44.

By reference to Figure 2 it will be seen that the core 72 has connection with a horizontally pivoted latch 74 through the intervention of a linkage arrangement 76. Thus, when the magnet 44 is energized coincident with the actuation of the feeler 24 through engagement by a seam or by the passing of a metallic element, such as a pin or the like in the selvage of the cloth between the feeler 24 and the transversely extending metallic bar 38, the latch 74 is retracted so as to allow a crank 78 to actuate a lever 80.

In Figure 2 it is illustrated that the crank 78 is held immediately in back of the fork lever 80 by the latch 74 and when the latch is retracted a contractile coil spring 82 associated with the crank, swings the crank in a counterclockwise direction as viewed, so that the lever 80 is actuated.

By reference to Figure 4 it will be seen that the actuation of the forked lever 80 on the supporting shaft 84 thereof will bring about the advancement of a clutch spool 86. What might be said to be the inner end portion of the clutch spool 86 is tapered for engagement by the rollers 88 or bell cranks 90.

Motion transmitting set screws 92 are carried by the bell cranks 90 and are adjustable for proper engagement with the movable and, of course, the rotatable clutch element 94. Thus, inward movement of the clutch spool 86 will bring about rocking of the bell cranks 90 and actual movement of the clutch plate 98 into operative relation to a friction disk 100 attached to a constantly driven clutch element 96.

It will be seen that there is a second clutch plate 98 and a friction disk 100 between the clutch plates 94 and 98, the said friction disk being connected at the peripheral portion thereof with the lugs 102 of the constantly turning clutch element 96. As shown in Figure 3, the connection of the friction disk 100 with the lug 102 allows of the necessary axial movement of the clutch members 94 and 98 as an incident to the engagement and dis-engagement of the clutch members with said friction disk 100.

It is further shown in Figure 3, that the clutch plate 98 is provided with axially extending ears 104 which extend through the central opening 106 in the disk 100 to which ears 104 the bell cranks 90 are pivoted.

In Figure 3 there is also a showing of the fact that the clutch plate 96 has permanent connection with a beveled gear 108 which is permanently in mesh with a driving gear 110, the latter being mounted on any convenient constantly turning shaft on the machine. The clutch plate 96 is permitted to turn with respect to the shaft 112 upon which it is mounted while the clutch plate 94 is, as shown in Figure 3, keyed on the shaft 112 so that when the bell cranks 90 are actuated, a driving connection will be established between the clutch plates 94, 100, 98 and 96, causing these parts to turn together and thus bringing about rotation of the shaft 112. In other words, rotation of the shaft 112 is brought about by movement of the clutch spool 86 inward in a direction to rock the bell cranks 90.

When the shaft 112 is thus turned, a similar movement is imparted to a disk 114 keyed or otherwise secured on one end of the shaft. As illustrated in Figure 4, the disk 114 is provided at a spaced point from the axis thereof with an axial pin 116 mounted in the slot 118 of a piston rod 120.

The piston rod 120 is provided at the upper portion thereof with a piston 122 mounted within a cylinder 124. The cylinder 124 is swivelly connected to the frame of the machine by a U-shaped bracket 126 so that when the shaft 112 is turned, the piston rod 120 may be moved upwardly into the cylinder 124. That is to say, the pivotal mounting of the cylinder 124 permits of the arcuately moving pin 116 to bring about longitudinal movement of the piston rod 120.

As illustrated in Figure 4, the cylinder 124 contains oil or fluid adaptable for the purpose, and the upper portion of the cylinder has connection with a flexible shaft 128 which communicates with a second cylinder 130. The cylinder 130 encloses a piston 132 which is directed upwardly by the fluid entering the cylinder 130 and such upward movement of the piston brings about corresponding movement on the part of the piston rod 134. As clearly illustrated in Figure 1, the upper portion of the piston rod 134 has connection with the blade frame 14 through the intervention of a pin 136 carried by the handle 18 and a slot 138 formed in the upper portion of the rod 134.

In reviewing the operation of the device as thus far described, it will be clearly seen that when there is encountered a seam or a metallic element such as a pin or the like in the cloth the feeler 24 closes the electric circuit including a source of electrical supply and the solenoid 44 to bring about endwise movement of the core 72 and such endwise movement of the core releases the latch 74 to allow the spring 82 to assert itself and thereby produce endwise movement of the clutch spool 86. Such endwise movement of the clutch spool 86 establishes a driving connection between the clutch plates to transmit the motion of the beveled gear 110 to the shaft 112 and in this way move the piston 122 to set up a flow of fluid through the cylinders and thereby move the piston rod 134 so as to move the shearing element 12 from its operative association with the cloth.

After the piston rod 134 has been raised and it starts its downward movement, its descent is checked or throttled by the by-pass ports 140 in the lower end of the cylinder 130.

As illustrated in Figure 10 there are four of these by-pass ports 140 and such ports establish communication between the cylinders and the flexible conduits 128 to allow of the throttled descent of the piston 132. A disk 142 is mounted in the cylinder 130 and is provided with a plurality of ports for registration with the ports 140 and by circumferential adjustment of the disk 142 the rate of descent of the piston 132 may be varied.

It is to be noted that admission of fluid into the cylinder 130 is not only by way of the ports 140 but by way of a check valve 144. In fact, the major flow of fluid in the cylinder 130 is by way of the spring seated check valve 144.

Now, referring again to the elevation of the shearing element to an inoperative position, it is pointed out that at the time the shearing element reaches its uppermost or fully retracted position, the shaft 112 will have made one-half of a complete revolution. On the following quarter revolution, an arcuate cam 146 carried by the clutch plate 94 is engaged with a crank 148 to move the same downward. It is shown in Figure 2, that the crank 148 is keyed or otherwise secured on the shaft 150 on which the crank 78 is also rigidly secured so that downward movement of the crank 148 under the influence of the descending cam 146 will bring about turning of the crank 78 to the retracted position suggested in Figure 2. This retraction of the crank 78 is against the contrary influence of the spring 82 and when the crank 78 reaches the limit of its retraction it moves beneath the latch 74, which latch holds it in position for subsequent operation.

The completion of the revolution or on the final quarter turn of the shaft 112 the radial pin 152 carried by the clutch spool is engaged by a cam or stop block 154 and since the cam block extends more or less spirally, the spool is retracted so as to break the engagement of the clutch plates and interrupt the drive. It is illustrated in Figure 4, that the stop block 154 has one end thereof positioned in the path of travel of the pin 152 so as to arrest further turning of the spool and at the same time to maintain the spool and associated shaft in a predetermined position for re-starting.

In Figure 3 it is shown that the clutch spool 86 is keyed for sliding movement on the shaft 112, the block 154 being formed with an L-shaped opening allowing the pin 152 to pass through the same.

With reference to the foregoing description it will be seen that the improved retracting mechanism for the shearing element provides an automatic means by which the shearing mechanism is retracted when a transverse seam is encountered, so that the operator who was formerly required to manually retract the shearing element is now free to attend to a number of machines and at the same time to supervise the operation of other parts of the machine. It will also be seen that the feeler mechanism is so constructed that it performs a two-fold function, namely, of retracting the shearing mechanism upon the encountering of a seam in the cloth, and that of retracting the shearing mechanism upon the encountering of any metallic element or the like which might be harmful and injurious to the cutting knives of the shearing element.

Although there is illustrated but a single shearing element it is to be clearly understood that in machines where there are two or more shearing elements employed, the mechanism for retracting the several shearing elements may be duplicated or equaled in number to the shearing elements.

It is also to be specifically understood that the construction and arrangement of the feeler may be varied for different kinds of shearing machines and cloth, and that the form of invention herein shown and described is to be taken as a preferred example of the same and that such minor changes in arrangement and construction of parts may be made as will remain within the scope of the invention and that only such limitations shall be imposed thereon as are indicated in the prior art or in the appended claims.

Having thus described the invention what is claimed is:

1. In a cloth shearing machine, a shearing element, means for retracting said shearing element, and means controlled by a seam of the cloth or a metallic element in the cloth for actuating said retracting means.

2. In a cloth shearing machine, a shearing element, means for retracting said shearing element, a feeler associated with the cloth and actuated by a seam of the cloth or a metallic element in the cloth, and means connected to said shearing retracting means and controlled by the actuation of said feeler for retracting said shearing element.

3. In a cloth shearing machine, means for retracting the shearing element, a feeler mechanism associated with the cloth and adapted to control the retracting operation of the shearing element, comprising a pivotally mounted support adjacent the cloth, a metallic feeler on said support spaced from said cloth, a metallic conducting bar on the other side of said cloth opposite said feeler, and a pair of electrical contacts actuated by said feeler.

4. In a cloth shearing machine, means for retracting the shearing element, a mechanism for controlling the retracting movement of the shearing element, comprising a pivotally mounted feeler disposed adjacent and spaced from the cloth, a metallic member on the other side of said cloth opposite said feeler, and electrical contacts actuated by the movement of said feeler.

5. In a cloth shearing machine, means for retracting the shearing element, a mechanism for controlling the retracting movement of the shearing element, comprising a pivotally mounted feeler disposed adjacent and spaced from the cloth, a metallic member on the other side of said cloth opposite said feeler, an electrical contact carried by said feeler, and a stationary electrical contact associated with said first named contact.

6. In a cloth shearing machine, means for retracting the shearing element, a mechanism for controlling the retracting movement of the shearing element, comprising a pivotally mounted feeler disposed adjacent and spaced from the cloth, a metallic member on the other side of said cloth opposite said feeler, an electrical contact carried by said feeler, and an associated stationary contact electrically connected to said metallic member and adapted to be electrically contacted by the contact carried by the feeler upon movement of the feeler.

7. In a cloth shearing machine, means for retracting the shearing element, a mechanism for controlling the retracting movement of the shearing element upon the encountering of a seam or a metallic element in the cloth comprising a pivotally mounted metallic feeler disposed on one side and transversely of the cloth, a metallic member on the other side of said cloth opposite said feeler, a pair of associated electrical contacts and actuated by the movement of said feeler, one of said contacts being electrically connected to said feeler and the other contact electrically connected to said metallic member.

8. In a cloth shearing machine, means for retracting the shearing element, a mechanism for controlling the retracting movement of the shearing element upon the encountering of a seam of a metallic element in the cloth comprising a pivotally mounted metallic feeler disposed on one side and transversely of the cloth, a metallic member on the other side of said cloth opposite said feeler, an electrical contact actuated by the movement of said feeler and electrically connected thereto, and a stationary electrical contact normally spaced from and electrically contacted by said first named contact upon movement of the feeler.

9. In a cloth shearing machine, means for retracting the shearing element, a mechanism for controlling the retracting movement of the shearing element upon the encountering of a seam or a metallic element in the cloth comprising a pivotally mounted metallic feeler disposed on one side and transversely of the cloth, a metallic member on the other side of said cloth opposite said feeler, an electrical contact actuated by the movement of said feeler and electrically connected thereto, and a stationary electrical contact normally spaced from and electrically contacted by said first named contact upon movement of the feeler, said stationary electrical contact being electrically connected to said metallic member.

10. In a cloth cutting machine, a cutting element, means for retracting said cutting element, and means controlled by a metallic surface projection in the cloth for actuating said retracting means.

11. In a cloth shearing machine, a shearing element, means for retracting said shearing element, and means controlled by a metallic element in said cloth for actuating said retracting means.

12. In a cloth shearing machine, a shearing element, means for retracting said shearing element, and means controlled by a metallic element projecting beyond opposite surfaces of said cloth for actuating said retracting means.

13. In a cloth shearing machine, a shearing element, means for retracting said shearing element, and means controlled by a foreign surface projection in the cloth for actuating said retracting means.

14. In a cloth working machine, a support for movably supporting cloth, a cloth working element in operative relation to one surface of the cloth, and means actuated by a surface inequality in the cloth or a metallic element in the cloth for interrupting the said operative relation between the cloth working element and the surface of the cloth when said surface inequality or the metallic element in the cloth is in range of the working element.

15. In a cloth working machine, a support for movably supporting cloth, a cloth working element in operative relation to one surface of the cloth, and means actuated by a surface inequality in the cloth or metallic element in the cloth for interrupting the said operative relation between the cloth working element and the surface of the cloth when said surface inequality or the metallic element in the cloth is in range of the working element, and restoring the working element to operative engagement with the surface of the cloth when the surface inequality in the cloth or the metallic element in the cloth passes beyond the range of the working element.

16. In a cloth working machine, a support for movably supporting cloth, a cloth cutting element in operative relation to one surface of the cloth, and means actuated by a metallic element in the cloth for interrupting the said operative relation between the cloth cutting element and the surface of the cloth when the metallic element is in range of the cutting element, and restoring the cutting element to operative engagement with the surface of the cloth when the metallic element passes beyond the range of the cutting element.

17. In a cloth shearing machine, a support for movably supporting cloth, a cutting element in operative relation to one surface of the cloth, and means actuated by a seam of the cloth, or a metallic element in the cloth for interrupting the said operative relation between the cutting element and the surface of the cloth, the said seam or metallic element being in range of the cutting element, and restoring the cutting element to operative engagement with the surface of the cloth when the metallic element passes beyond the range of the cutting element.

18. In a cloth working machine, a support for movably supporting cloth, a cloth cutting element in operative relation to one surface of the cloth, and means actuated by a foreign element in the cloth for interrupting the said operative relation between the cloth cutting element and the surface of the cloth when the foreign element is in range of the cutting element and restoring the cutting element to operative engagement with the surface of the cloth when the foreign element passes beyond the range of the cutting element.

HENRY U. BASSO.